UNITED STATES PATENT OFFICE.

LOUIS MEUNIER, OF LYON, FRANCE.

MANUFACTURE OF VARNISHES.

1,067,536.  Specification of Letters Patent.  Patented July 15, 1913.

No Drawing.   Application filed November 12, 1912. Serial No. 730,871.

*To all whom it may concern:*

Be it known that I, LOUIS MEUNIER, a citizen of the French Republic, residing at Lyon, in France, have invented certain new and useful Improvements in the Manufacture of Varnishes, of which the following is a specification.

This invention relates to improvements in the manufacture of varnishes.

The applicant has found that if a concentrated solution of tannin of any kind in water is prepared and it is applied by means of a brush in a thin layer on a flat surface the deposited layer has when dry a brilliant surface like varnish. He has however found that such solution could not be applied in an even fashion but was irregular and streaks of a disagreeable appearance appeared which rendered the solution unemployable in this form. Further, drying of the coating was relatively slow.

To render the use of concentrated tannin solutions as varnish practicable and to overcome the above mentioned inconveniences I incorporate with the tannin solution a substance adapted to reduce the superficial tension of contact of the solution with the surface to be varnished while increasing the speed of drying by the oxidation of tannin.

The most suitable method consists in simultaneously incorporating in the tannin extract an alkaline sulforicinate which lowers the superficial tension of the tannic liquid, and a highly rectified turpentine (essence of turpentine or oil of camphor for example) which increases oxidation and the drying of the tannic coating. For this purpose I have made use of the property which turpentine products possess of dissolving in sulforicinates. The following is a method of operating: 25 kilograms of neutral sulforicinate of soda is placed in a vat provided with agitating and heating means and heated to a temperature of 60 degrees and four liters of a turpentine substance essence of turpentine for example, is poured in gradually while constantly agitating the mixture. The turpentine is dissolved in the sulforicinate and a thick transparent solution is obtained.

To the mixture of sulforicinate of soda and turpentine is added 25 times its weight of aqueous tannic extract at about 25° Baumé. After agitating the mixture a non-inflammable liquid is obtained which is of brilliant appearance, is fluid and is perfectly applicable with a brush in a smooth layer of equal thickness. It dries in a few minutes with a remarkably brilliant surface having the appearance of a high class varnish prepared from expensive gum-resins and equally expensive solvents.

The varnish is adapted for application to wood, leather, paper, etc.

Certain substances such as linseed oil capable of giving it a certain elasticity can be incorporated with the varnish.

What I claim as my invention and desire to secure by Letters Patent of the United States is:—

1. Process for the manufacture of a substance for use as a varnish comprising mixing a concentrated aqueous solution of tannin with a sulforicinate.

2. Process for the manufacture of a substance for use as a varnish consisting in mixing a concentrated aqueous solution of tannin with a sulforicinate and an oxidizing agent.

3. Process for the manufacture of a substance for use as a varnish consisting in mixing a concentrated solution of tannin in water with a sulforicinate and a turpentine preparation.

4. Process for the manufacture of a substance for use as a varnish consisting in mixing a concentrated solution of tannin in water with an alkaline sulforicinate and highly rectified turpentine.

5. Process for the manufacture of a substance for use as a varnish consisting in mixing a concentrated solution of tannin in water with neutral sulforicinate of soda and essence of turpentine.

6. Process for the manufacture of a substance for use as a varnish consisting in mixing a concentrated solution of tannin in water with a mixture of neutral sulforicinate of soda in which essence of turpentine has been dissolved under the action of heat.

7. Process for the manufacture of a substance for use as a varnish consisting in dissolving 4 liters of essence of turpentine, and 25 kilograms of neutral sulforicinate of soda under the action of heat and adding to the mixture thus obtained 25 times its weight of aqueous tannic extract of about 25.° Baumé.

8. A product adapted for use as a varnish comprising a mixture of aqueous solution of tannin, and a sulforicinate.

9. A product adapted for use as a varnish comprising a mixture of aqueous solution of tannin, and a sulforicinate, and a turpentine preparation.

10. A product adapted for use as a varnish comprising a mixture of a concentrated aqueous solution of tannin, neutral sulforicinate of soda, and essence of turpentine.

11. A product adapted for use as a varnish comprising a mixture of 25 kilograms neutral sulforicinate of soda, 4 liters of essence of turpentine and 25 times by weight of previously mentioned mixture of tannic extract.

In witness whereof I have signed this specification in the presence of two witnesses.

LOUIS MEUNIER.

Witnesses:
GASTON JEANNIAUX,
MARIUS HERMAZ.